Nov. 24, 1959   F. LA BARRE, JR., ET AL   2,913,817
PROPELLER SHAFT EXTENDER FOR PROPELLER SERVICING
Filed June 11, 1956
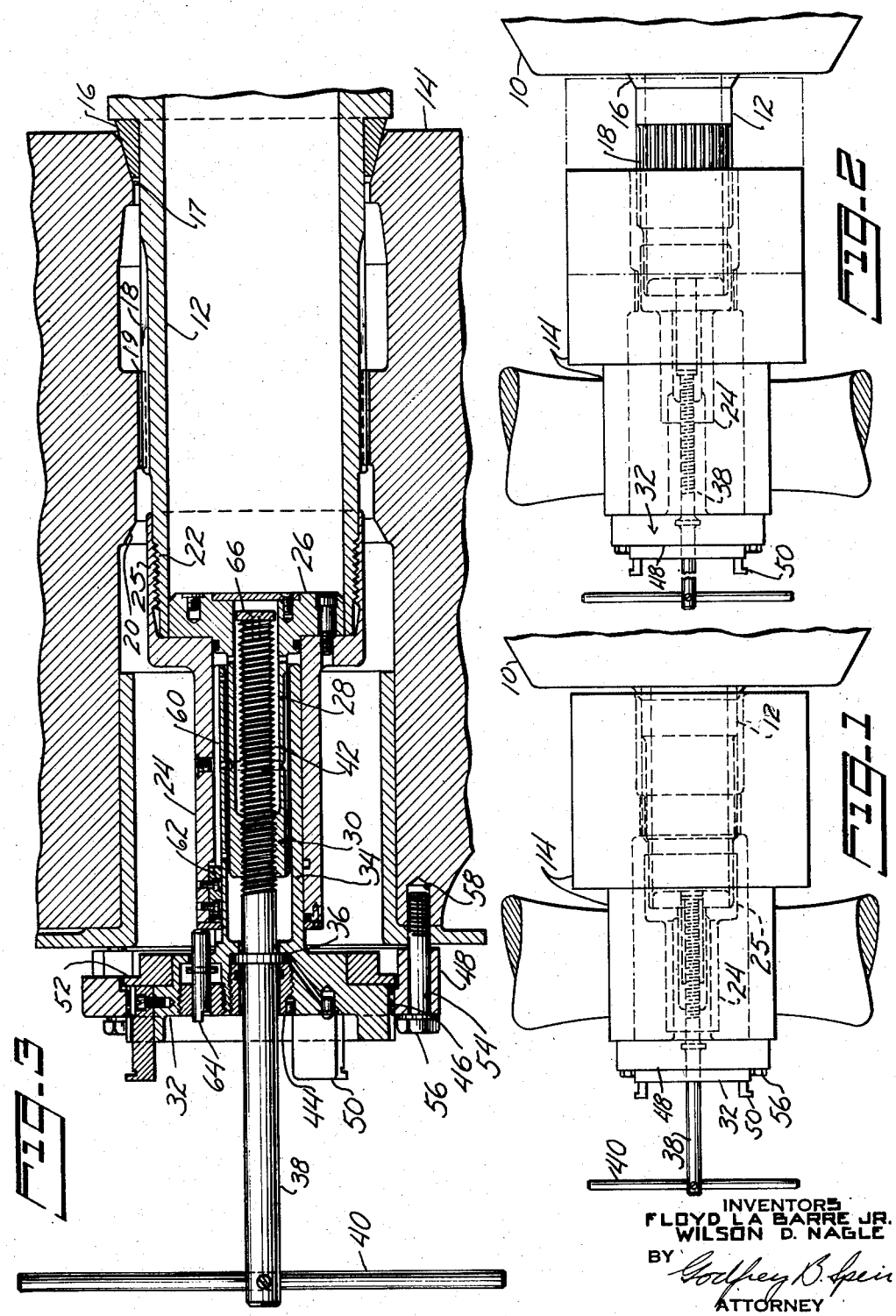
INVENTORS
FLOYD LA BARRE JR.
WILSON D. NAGLE
BY
ATTORNEY United States Patent Office 2,913,817
Patented Nov. 24, 1959

2,913,817

PROPELLER SHAFT EXTENDER FOR PROPELLER SERVICING

Floyd La Barre, Jr., Morris Plains, and Wilson D. Nagle, Fairlawn, N.J., assignors to Curtiss-Wright Corporation, a corporation of Delaware Application June 11, 1956, Serial No. 590,520

2 Claims. (Cl. 29—263)

This invention relates to aircraft propeller servicing tools, and provides a form of jack, attachable to an aircraft power plant, by which a propeller may be moved away from its normal position to provide access for inspection, servicing and repair. The tool holds the propeller secure on the power plant so that the need for propeller removal is avoided.

The desirability for a tool of the sort described and claimed herein arises from the fact that modern aircraft propellers are quite large and awkward to handle. They may have a weight of 1500 to 2500 pounds, which necessitates slings and hoisting equipment when they are removed from a powerplant. Since much of the inspection and minor repair of propellers and engines on aircraft is done under field servicing conditions, it is most desirable to avoid removal of heavy components, and to accomplish the necessary operations with the components in assembled relation on the aircraft. Specialized servicing tools, therefore, become economically practical and desirable where the tools may easily be handled by aircraft mechanics on the rollable scaffolds usually provided for them. Such scaffolds are needed to enable access to the aircraft components, which, in large aircraft, are usually from ten to fifteen feet above ground level.

In the case of tractor propellers on aircraft powerplants, operating parts of both engine and propeller which require inspection and servicing are frequently located between the two mechanisms, and the available space for the necessary work is inadequate. Prior to our invention, it has been necessary to mobilize hoisting gear so that the propeller can be removed. Upon work completion, the propeller must be re-aligned with the engine shaft and turned to the proper position relative thereto, slid onto the shaft and secured in place. By the use of our invention, the shaft extender tool is secured to the shaft on which the propeller is mounted and is also secured to the propeller. The propeller is then moved outwardly along the shaft and the extender and is held against further displacement. The amount of movement of the propeller is sufficient to provide the needed access for the work to be done.

On completion of the work, the propeller is moved back to its fully installed position without need for re-alignment since the desired alignment is held when the propeller is extended. The shaft extender is removed, and the propeller secured in place.

Objects of the invention are apparent from the above generalized statement of the problem and brief description. A fuller understanding of the particulars of the invention will be gained from the annexed drawings read with the following detailed description. In the drawings—

Fig. 1 is a side elevation of a propeller in operating position on an engine shaft, with the shaft extender in position for operation, Fig. 2 is a side elevation like that of Fig. 1, with the propeller spaced from the engine and carried by the shaft extender, and Fig. 3 is an enlarged section showing parts of the propeller and shaft, and the shaft extender in the invention.

In the drawings, an engine nose is shown at 10, from which a shaft 12 extends upon which a hub 14 of a propeller is mounted. While 10 is identified as an engine nose for convenience, it should be understood that this may be part of the powerplant or of the reduction gear thereof, the reduction gear being either close-coupled or remotely disposed from the engine proper. The usual mounting of the propeller on the shaft includes a rear centering cone 16 engaging a conical recess 17 on the hub and external driving splines 18 on the shaft engaging internal splines 19 in the hub. The propeller is secured by a centering cone, not shown, engaging a forward conical recess 20 in the hub, the centering cone being secured by a hub nut, not shown, engaging screw threads 22 on the outer end of the shaft 12.

The shaft extender of the invention comprises the several elements now to be described. A sleeve 24 includes an integral nut portion 25 which is engaged with and screwed firmly on the threads 22, the normal propeller hub nut and the front centering cone having been removed. The sleeve 24 is provided with a secured plug 26 at its right end, as shown, which fits snugly within the end of the shaft 12. This plug assists in centering and supporting the sleeve on the shaft. Nut portion 25 is rather thin-walled, as it must be small enough in external diameter to allow the propeller splines 19 to slide over it. The plug 26 includes a tubular portion 28, internally threaded at 30 at its leftward end, the portion 30 and the sleeve 24 all being coaxial with the shaft 12 when assembled as shown.

A head 32 is disposed at the left end of the sleeve 24, and has an integral tubular portion 34 slidably engaged with the bore of the sleeve 24, whereby the head 32 and portion 34 may slide axially toward and away from the propeller shaft. Head 32 has a central bearing 36 in which a shaft 38 is journalled, the shaft 38 having a turning bar 40 at its outer end, and being threaded at 42 at its inner end, the threads engaging the internal threads 30 of the tube 28. The shaft 38 is flanged at the bearing 36, and is held in the bearing by a thrust nut 44, so that the shaft 38 and head 32 are secured for joint axial movement but for relative rotation.

The rim of the head 32 is splined at 46; on these splines an internally splined ring 48 is fitted. Ring 48 may be slid outwardly on splines 46 to disengage them, so that the rotational relation of the ring and head may be adjusted. To hold the ring from inadvertent loss or removal, it is piloted on a plurality of fingers 50 secured to the head 32. The ring, when assembled on the splines 46, moves rightwardly to engage a stop flange 52 on the head 32. Bolt holes 54 are provided around the ring 48 for engagement by bolts, one of which is shown at 56. Bolts 56 engage tapped holes 58 in the propeller hub 14, securing the ring 48 and hence the head 32 to the exposed face of the propeller hub.

As mentioned before, the tubular portion 34 carrying the head 32 is axially slidable in the sleeve 24. The portion 34 has a keyway cut in it at 60, engaged by a key 62 secured within the sleeve 24. This holds the head 32 and portion 34 from rotation relative to the sleeve 24.

The shaft extender tool is used in the following manner. After removal of the propeller hub nut and front centering cone from the propeller and shaft assembly, the tool is passed into the hub and the nut 25 of the tool is engaged with the propeller shaft threads 22. The tool is rotated and firmly screwed onto the shaft so that it will not back off unless considerable deliberate unscrewing torque is applied. The screw handle 40 is turned to move the head axially to a position relative to sleeve 24 so that the flush pin gage 64 appears at the surface of 32. Now, the ring 48 is slid leftwardly from splines 46 onto fingers 50 and is turned until holes 54 in the ring are aligned with holes 58 in the face of the propeller hub. Capscrews 56 are passed into the aligned holes and tightened, anchoring the hub, head 32 and ring 48 together. The bar 40 is rotated, whereupon the screw 38 backs out of the fixed screw threads 30, and the whole assembly of head, ring and propeller hub is jacked leftwardly as shown from the propeller shaft. The hub is supported by the shaft extender and may not rotate relative to the shaft 12. The leftward jacking is continued until a stop button 66 on the inner end of the screw 38 engages the end of the threaded portion 30. Then the propeller will occupy the position shown in Fig. 2, leaving considerable room between the propeller and engine nose for inspection, repair work and the like.

Restoration of the propeller to its operative position is done by turning the screw bar 40 the other way, which jacks the propeller on the shaft, re-engages the splines 18, 19 in their original relation, and jams the centering recess 17 against the centering cone 16. The final position is gaged by the flush pin gage 64. Capscrews 56 are then removed, and the head 32 is rotated to unscrew the nut 25 from the shaft threads 22. The shaft extender tool assembly is withdrawn, and the conventional front centering cone and propeller hub nut are replaced in the usual manner.

The invention has been described with particular reference to aircraft propellers mounted on shafts, but the same kind of tool equipment may be applicable in other environments where the components to be moved and held are of different character.

It will be appreciated that the tool of the invention can have great utility in field service operations, when it is realized that a propeller weighing as much as 2500 pounds may easily be manipulated by one man aided by the tool of the invention, which may weigh as little as 25 to 40 pounds.

While we have described our invention in its present preferred embodiment, it will be apparent to those skilled in the art that it may be modified and altered without departing from the spirit or scope of the invention. For a definition of the scope and limits of the invention, reference should be had to the following claims.

We claim:

1. A shaft extender for holding an aircraft propeller in desired relation to a hollow propeller shaft while moving the propeller axially of the shaft during servicing operations, said propeller having a keyed driving connection with the shaft and being normally secured thereto by a threaded nut, comprising an extension coaxial with the shaft having a threaded end engaging the threaded shaft end in lieu of the nut, a head element slidable along said extension and constrained from rotation relative thereto, said head element being adapted to abut the end of the hub of the propeller, an adapter ring, said head element and ring having inter-engaging splines capable of engagement in a large plurality of relative rotational positions, means to secure said ring to the front face of the propeller hub after the ring has been suitably located and engaged with the head splines, and screw jack means engaging said extension and head element to move said head element axially along said extension along with said ring and propeller.

2. A shaft extender for holding an aircraft propeller in desired relation to a propeller shaft while moving the propeller axially of the shaft during service operations, said propeller having a keyed driving connection with the shaft and being normally secured thereto by a threaded nut, comprising an extension coaxial with the shaft having a threaded end engaging the threaded shaft end in lieu of the nut, a head element slidable along said extension and constrained from rotation relative thereto, an adapter ring fixable on said head in any one of a plurality of relative rotational positions, means to secure the ring to the propeller hub after the ring has been suitably located, and screw jack means engaging said extension and head element to move said head element axially along said extension with said ring and propeller.

References Cited in the file of this patent
UNITED STATES PATENTS

| | | |
|---|---|---|
| 1,658,896 | Hays | Feb. 14, 1928 |
| 1,807,329 | West et al. | May 26, 1931 |
| 2,235,953 | Whitfield | Mar. 25, 1941 |
| 2,487,331 | Greene | Nov. 8, 1949 |

FOREIGN PATENTS

| | | |
|---|---|---|
| 825,172 | France | Nov. 27, 1937 |